United States Patent [19]

Lawson

[11] Patent Number: 5,268,424
[45] Date of Patent: Dec. 7, 1993

[54] CHLORINATED POLYVINYL CHLORIDE/POLYCARBONATE BLEND

[75] Inventor: Dennis L. Lawson, Brunswick, Ohio

[73] Assignee: The B. F. Goodrich Company, Akron, Ohio

[21] Appl. No.: 892,438

[22] Filed: Jun. 1, 1992

Related U.S. Application Data

[63] Continuation of Ser. No. 619,590, Nov. 29, 1990, abandoned.

[51] Int. Cl.$^5$ .............. C08L 27/24; C08L 27/06; C08L 69/00
[52] U.S. Cl. .............. 525/67; 525/84; 525/85; 525/86; 525/133; 525/146
[58] Field of Search .............. 525/67, 84, 85, 86, 525/133, 146

[56] References Cited

U.S. PATENT DOCUMENTS

| | | | |
|---|---|---|---|
| 4,181,644 | 1/1980 | Lehr | 525/84 |
| 4,515,921 | 5/1985 | Witman | 525/67 |

FOREIGN PATENT DOCUMENTS

| | | | |
|---|---|---|---|
| 118707 | 9/1984 | European Pat. Off. | 525/67 |
| 0121662 | 10/1984 | European Pat. Off. | |
| 0239090 | 9/1987 | European Pat. Off. | |
| 1-210450 | 8/1989 | Japan | |

OTHER PUBLICATIONS

Braun, "Properties of PVC Blends with Polycarbonates and Chlorinated Polyethylene", Makromol. Chem. Macromol, Symp. (29) pp. 227-240; 1989.

European Search Report of Apr. 2, 1992 on European Appl. 91 12 0097.

*Primary Examiner*—David J. Buttner
*Attorney, Agent, or Firm*—Daniel J. Hudak; Samuel B. Laferty; Helen A. Odar

[57] ABSTRACT

A chlorinated polyvinyl chloride/polycarbonate blend is prepared utilizing a conventional vinyl impact modifier such as methyl methacrylate-butadiene-styrene (MBS) copolymer as a compatibilizing agent. The blend has good thermomechanical properties such as good dimensional stability under heat, good impact resistance, and improved processability. The chlorinated polyvinyl chloride, polycarbonate, and impact modifier are simultaneously mixed or, alternatively, a preblend of the polycarbonate and the conventional impact modifier is made to which the CPVC is subsequently added and blended.

28 Claims, No Drawings

CHLORINATED POLYVINYL CHLORIDE/POLYCARBONATE BLEND

This application is a continuation of application Ser. No. 07/619,590, filed on Nov. 29, 1990, by Dennis Lee Lawson, for CHLORINATED POLYVINYL CHLORIDE/POLYCARBONATE BLEND now abandoned.

FIELD OF THE INVENTION

The present invention relates to thermoplastic blends of chlorinated polyvinyl chloride and polycarbonate, wherein conventional impact modifiers such as copolymers of acrylonitrile-butadiene-styrene, methyl methacrylate-butadiene-styrene, and the like, act as compatibilizing agents. The blends have improved physical properties including improved heat distortion temperatures, impact strength, and processability.

BACKGROUND ART

It is well known to the art and to the literature that a chlorinated vinyl polymer referred to as chlorinated polyvinyl chloride, hereinafter CPVC, has excellent high temperature performance characteristics, among other desirable physical properties. Typically, commercial CPVC has in excess of about 57 percent by weight of bound chlorine, and is most conveniently prepared by the chlorination of polyvinyl chloride (hereinafter PVC) as described in U.S. Pat. Nos. 2,996,489; 3,100,762; 3,334,077; 3,334,078; 3,506,637; 3,534,013; 3,591,571; 4,049,517; 4,350,798; 4,377,459; 4,412,898; and 4,459,387, inter alia.

The term CPVC is used herein to define a chlorinated vinyl chloride polymer having in excess of about 58 percent by weight of bound chlorine. CPVC has become an important specialty polymer due to its relatively low cost, high glass transition temperature, high heat distortion temperature, outstanding flame and smoke properties, chemical inertness, and low sensitivity to hydrocarbon feed stock costs. The glass transition temperature of CPVC generally increases as the percentage of chlorine increases. However, a well known undesirable characteristic of CPVC resin is that it inherently has low impact properties, a characteristic which is also common to vinyl chloride homopolymers. Moreover, as the chlorine content increases, the CPVC resin becomes more difficult to melt process, and also becomes more brittle.

The poor melt processability of CPVC resins is exemplified by milling CPVC on a roll mill which results in high torque and high temperatures as well as decomposition of the CPVC. Softening additives or plasticizers have been added to CPVC in order to improve its processability. Although its processability is somewhat improved, these additives produce undesirable effects. Some of the more significant detrimental effects produced by inclusion of these softening or plasticizer additives are lower heat distortion temperatures, softness and weakness in terms of lower tensile strength, and less desirable chemical properties than those exhibited by CPVC alone. These negative attributes of the additives on CPVC limit usefulness of the modified CPVC in the manufacture of rigid plastic articles.

The increasing demand for CPVC pipes, vessels, valve bodies and fittings, and the fact that an impact-deficient CPVC matrix can be improved by compounding and blending it with other polymers, has instigated concerted efforts to develop better impact modified CPVC compositions having increased heat distortion temperatures, and increased ease of melt-processing. Most of these efforts have been channeled toward rigid CPVC applications where acceptable impact strength and dimensional stability under heat are critical. These include the manufacture of exterior structural products, rigid panels, pipe and conduit, injection-molded and thermoformed industrial parts, appliance housings, and various types of containers both large and small.

U.S. Pat. No. 3,264,375 to Robert W. Jones relates to rubber-modified styrene-type polymers and more particularly relates to processes for preparing such materials and for producing rubber-in-monomer solutions to be employed in preparing such materials.

U.S. Pat. No. 3,882,192 to Elghani et al relates to moulding compositions consisting of a) 5 to 95 parts by weight of a polycarbonate, b) 5 to 95 parts by weight of a vinyl chloride polymer, and c) 5 to 95 parts by weight of an ABS graft polymer, a styrene/maleic anhydride copolymer or an ethylene/vinyl acetate copolymer.

U.S. Pat. No. 3,886,235 to Tanaka et al relates to a process for production of vinyl chloride resin composition, by uniform blending of 95 to 70 parts by weight of vinyl chloride resin, and 5 to 30 parts by weight of a modifying component obtained by graft-polymerizing upon a crosslinked copolymer rubber latex a first and then a second grafting component in a sequential two-stage process.

U.S. Pat. No. 3,991,009 to Margotte et al relates to thermoplastic moulding compositions of 1) 70 to 20 percent by weight of graft polycarbonates whose graft stock is a vinyl polymer with a molecular weight of from 10,000 to 100,000, containing from 3 to 10 side chains attached by carbon, each of which contains a hydroxyphenyl group, on which aromatic polycarbonate chains are condensed, and 2) 30 to 80 percent by weight of graft polymer rubbers obtained by polymerizing a mixture of 2.1) 50 to 90 percent by weight styrene, a-methylstyrene, methylmethacrylate or mixtures thereof, and 2.2) 10 to 50 percent by weight acrylonitrile, methacrylonitrile, methylmethacrylate or mixtures thereof on a diene or acrylate rubber.

U.S. Pat. No. 4,105,711 to Hardt et al relates to polymer mixtures consisting of a) 20 to 90 percent by weight of a vinyl chloride polymer; b) 10 to 80 percent by weight of a polycarbonate in which at least 50 percent by weight of the structural units have the formula (1):

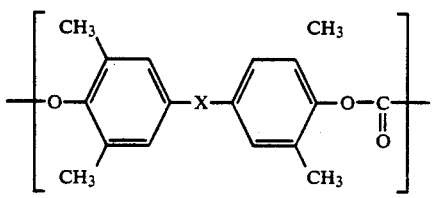

wherein x is a single bond, O—, —CO—, —SO$_2$—, C$_1$ to C$_{10}$ alkylene, C$_1$ to C$_{10}$ alkylidene, C$_3$ to C$_{15}$ cycloalkylene, C$_3$ to C$_{15}$ cycloalkylidene, C$_5$ to C$_{20}$ cycloalkyl alkylidene or

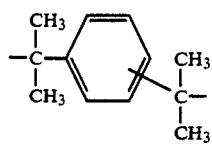

and c) up to 100 percent by weight, based on the mixture of (a) and (b) of a rubber.

U.S. Pat. No. 4,173,598 to Castelazo et al relates to processes for making polymeric compositions which have methacrylic and/or acrylic chains grafted onto a copolymerized vinyl diene substrate. The compositions are particularly useful as impact modifiers for polyvinyl chlorides.

U.S. Pat. No. 4,362,845 to Kamata et al relates to a composition with high impact resistance and little fish eyes content, comprising 97 to 60 parts by weight of a polyvinyl chloride-base resin and 3 to 40 parts by weight of a graft copolymer obtained by the three-stage graft-polymerization of 65 to 25 parts by weight of a monomer combination (B) comprising 12 to 57 percent by weight of methyl methacrylate, 1 to 24 percent by weight of at least one of alkyl acrylates having a $C_{1-8}$-alkyl group, 80 to 40 percent by weight of styrene and 0 to 3 percent by weight of a polyfunctional crosslinking agent having one or more alkyl groups in the molecule onto 35 to 75 parts by weight of a butadiene-base elastomer (A) containing 30 percent by weight or more of 1,3-butadiene units.

U.S. Pat. No. 4,399,093 to Kirby et al relates to a method of molding an element from liquid synthetic resin wherein liquid resin is introduced into a mold cavity through a first gate and liquid resin is concurrently introduced into the mold cavity through a second gate with portions of the resin received through each of the gates meeting at a joint interface. The resin in the second gate is caused to solidify sooner than the resin in the first gate so that the leading surface of the resin received through the first gate projects into a leading surface portion of the resin received through the second gate during the mold packing operation to provide an enlarged weld line area and improved strength in the joint.

U.S. Pat. No. 4,443,585 to Goldman relates to impact modifiers having high efficiency at low levels and at low temperatures comprising at least three stages, Stage A being a non-crosslinked polymer of at least 70 percent butadiene and at least 10 percent lower alkyl ($C_2$ to $C_8$) acrylate, Stage B being a polymer of at least 80 percent styrene, and Stage C containing at least 50 percent methyl methacrylate and at least 1 percent alkyl ($C_1$ to $C_4$) acrylate, the ratio of Stages A:B:C, excluding optional additional stages, being about 70-85:10-15:10-20, the ratio of stages C:B being at least 1, and Stage A being non-agglomerated are disclosed. Also disclosed are methods of preparing the impact modifier and thermoplastic polymer compositions containing the impact modifier.

U.S. Pat. Nos. 4,504,623 and 4,504,624 to Heuschen et al, and assigned to General Electric Company, relate to a method of preparing a polymer mixture and the mixture per se, respectively, wherein the mixture comprises PVC, aromatic polycarbonate, and rubber-like polymers such as ABS, the various acrylates, and the like. The method includes the steps of initially mixing the rubber-like polymer with the polycarbonate at a temperature above 220° C., with the resulting blend being mixed with polyvinyl chloride at a temperature below 220° C.

U.S. Pat. No. 4,617,329 to Weese et al relates to a polymer blend comprising from about 60 parts to about 99.9 parts by weight of a pigmented thermoplastic resin, which resin is a polyester or a polycarbonate or mixtures thereof, and from about 0.1 part to about 40 parts of a sequentially produced multi-stage polymer. The multi-stage polymer comprises a polymer core of at least about 10 parts, based on the weight of the multi-stage polymer. The core is polymerized from a styrenic monomer, or a mixture of styrenic monomers. The styrenic monomer of the core comprises at least about 50 percent by weight of said core. A second monomer may be present and a crosslinking monomer for styrene is present in said core. The second stage of the multi-stage polymer comprises a polymeric soft stage and the outer stage of the multi-stage polymer is a rigid thermoplastic.

U.S. Pat. No. 4,663,375 to Tamura relates to a process for producing a thermoplastic resin molding which comprises adding to a thermoplastic resin an organic compound which is compatible with said thermoplastic resin to form a homogeneous phase at a molten state of said thermoplastic resin and causes phase separation by cooling, molding the composition by melting, and solidifying it by cooling; and the molding thus obtained.

U.S. Pat. No. 4,680,343 to Biing-lin Lee relates to CPVC/polycarbonate blends containing ethylene-based functional polymers and impact modifiers.

U.S. Pat. No. 4,766,177 to Miller et al relates to adhesion of acrylic polymer coatings to plastic substrates which can be obtained by the addition of an isocyanate modified polyester copolymer to the acrylic polymer coating.

U.S. Pat. No. 4,769,901 to Nagahori relates to a process for producing a PTC device comprising the steps of forming a laminate comprising a PTC composition and at least two electrode plates having the PTC composition sandwiched therebetween, superposing, on the surface of each of the electrode plates of the laminate, a lead plate to be electrically connected to the electrode, joining the electrode plate and the lead plate by spot welding, and during or prior to the spot welding process, forming at least one through hole penetrating through the electrode plate and the lead plate in the center of a weld. This process can minimize the heat damage of the PTC composition and the resulting PTC device has a low contact resistance.

U.S. Pat. No. 4,786,350 to Nesbitt et al relates to a manufacturing process for providing an extruded polyvinyl chloride exterior siding with a weatherable layer of polyvinyl fluoride which is disclosed. In a preferred embodiment, the process facilitates the production of dimensionally stable dark colored siding.

U.S. Pat. No. 4,787,135 to Nagahori relates to a process for producing a PTC device comprising the steps of forming a laminate comprising a PTC composition and at least two electrode plates having the PTC composition sandwiched therebetween, opposing the surface of a lead plate to be electrically connected to each of the electrodes, to the surface of each of the electrode plates of the laminate while contacting at a narrow area, and then passing a current between the electrode and the lead via the narrow contact surf ace to weld them. By this process, there is obtained a PTC device, having, at a portion of the joining interface between each electrode plate and each lead plate, a nugget formed by melting both the plates. This PTC device has a low contact resistance between the PTC composition and the electrode plates.

Thus, it can be seen that the need exists for thermoplastic blends of CPVC and polycarbonate having improved physical properties such as heat distortion temperatures, impact strength, and processability.

SUMMARY OF THE INVENTION

It is therefore a general aspect of the present invention to provide a thermoplastic blend containing CPVC and polycarbonate, wherein an impact modifier serves as a compatibilizing agent therefor.

It is another aspect of the present invention to provide a thermoplastic CPVC/polycarbonate blend, wherein the CPVC, polycarbonate, and an impact modifier are simultaneously blended, or alternatively, wherein a preblend of the polycarbonate and the impact modifier is made and subsequently blended with the CPVC.

It is a further aspect of the present invention to provide a thermoplastic blend, as above, which is melt processable at relatively low temperatures, such as below 220° C. to eliminate degradation of the CPVC, and which has good physical properties such as high heat distortion temperatures, impact resistance, flame retardancy, and the like.

These aspects are obtained by the thermoplastic polymer blend composition of the present invention comprising from about 30 percent to about 90 percent by weight of a chlorinated polyvinyl chloride containing from about 58 percent to about 70 percent by weight of chlorine therein, and optionally containing up to about 30 percent by weight of a chlorinated polyvinyl chloride copolymer based on the weight of the chlorinated polyvinyl chloride, and further optionally containing up to about 25 percent by weight of a polyvinyl chloride homopolymer and/or a polyvinyl chloride copolymer based on the weight of the chlorinated polyvinyl chloride, wherein said chlorinated polyvinyl chloride contains up to about 35 percent by weight of said optional copolymers based on the weight of the chlorinated polyvinyl chloride; from about 10 percent to about 80 percent by weight of an aromatic polycarbonate; and an effective amount of an impact modifier polymer so that the polymer blend has improved heat distortion temperature, impact strength, and processability.

DETAILED DESCRIPTION

The thermoplastic polymer blend of the present invention generally contains a chlorinated polyvinyl chloride, a polycarbonate, and an impact modifier as a compatibilizing agent.

The chlorinated polyvinyl chloride resins of the present invention include any post-chlorinated polyvinyl chloride, hereinafter CPVC, containing at least 58 percent by weight of chlorine. The CPVC resins desirably contain from about 58 percent to about 70 percent of chlorine by weight and preferably from about 63 percent to about 70 percent of chlorine by weight. It is to be noted that when a CPVC resin having a degree of chlorination within the preferred range of from about 63 percent to about 70 percent of chlorine by weight is utilized, CPVC displays properties quite different than those of PVC, in addition to those which are generally independent of the degree of chlorination such as solubility and heat distortion temperatures. These properties include increased glass transition temperature, increased tensile strength, and an increased melting point.

CPVC is known to the art and to the literature and is commercially available from several sources. CPVC can be made according to any commercial process or the like such as by a solution process, a fluidized bed process, a water slurry process, a thermal process, or a liquid chlorine process. Inasmuch as CPVC resins are known to the art as well as to the literature, they will not be discussed in great detail herein. Rather, reference is hereby made to the several CPVC patents set forth in the background art, e.g. U.S. Pat. Nos. 2,996,049; 3,100,762; etc., which are hereby fully incorporated by reference with regard to suitable types of CPVC which can be utilized, as well as to methods of preparation and the like. The CPVC resins utilized in the present invention generally have a density of from about 1.45 to about 1.67 grams/cc at 25° C. and a glass transition temperature (Tg) of from about 95° C. to about 200° C. Such Tgs are at least 20° C. higher than the glass transition temperature of unchlorinated PVC resins, as measured by a differential scanning calorimeter. The preferred CPVC resins have densities in the range of from about 1.55 to about 1.60 grams/cc at 25° C. and a glass transition temperature of at least 100° C.

According to the present invention, CPVC can be blended with or contain generally small amounts of PVC and/or PVC copolymers. The amount of the vinyl chloride homopolymer, a copolymer made from vinyl chloride-vinyl type comonomer, or blends thereof, can be up to about 25 percent by weight, desirably up to about 10 percent by weight, and preferably nonexistent based upon 100 parts by weight of the CPVC on the one hand and the vinyl chloride homopolymer, the vinyl copolymer of vinyl chloride-vinyl type comonomer, or blends thereof, on the other hand. When copolymers of vinyl chloride-vinyl type comonomer are utilized, the vinyl type comonomers are generally well known to the art and to the literature and include esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alpha-methylstyrene, vinyl toluene, chlorostyrene; vinyl naphthalene; diolefins having a total of from 4 to 8 carbon atoms such as butadiene, isoprene, and including halogenated diolefins such as chloroprene; monoolefins having from 2 to 10 carbon atoms, desirably 2 to 4 carbon atoms and preferably 4 carbon atoms, with isobutylene being highly preferred due to its tendency to slightly lower the glass transition temperature of the PVC; and the like; and mixtures of any of the above types of monomers and other monomers copolymerizable therewith as are known to the art and to the literature. An amount of vinyl chloride comonomer is utilized to produce a vinyl chloride-vinyl type copolymer containing from about 30 percent of vinyl chloride comonomer to about 99 or 100 percent based upon the total weight of the vinyl chloride-vinyl type copolymer, and preferably from about 20 percent of the vinyl chloride comonomer to About 99 or 100 percent by weight of the copolymer. The remainder of the copolymer is comprised of one or more of the above-noted vinyl-type comonomers, for example vinyl acetate.

Thus, an amount of vinyl-type comonomer when utilized to produce a vinyl chloride-vinyl-type copolymer is up to about 30 percent and preferably up to about 20 percent by weight of the copolymer.

It is further contemplated in the present invention that CPVC can be blended with a CPVC copolymer. The amount of the CPVC copolymer, which is made by chlorination of the vinyl type comonomers listed in the immediately preceding paragraph, or blends thereof, can be up to about 30 percent by weight, and preferably up to about 20 percent by weight based on 100 parts by weight of the CPVC on the one hand and the CPVC copolymer on the other hand. However, the total amount of the PVC, PVC copolymers, and/or CPVC copolymers is not to exceed up to about 35 percent based on 100 parts by weight of the CPVC on the one hand, and the PVC, PVC copolymer, and/or CPVC copolymer on the other hand.

Based upon the total amount of the CPVC and polycarbonate forming the thermoplastic blend of the present invention, the amount of the CPVC resins (including PVC or copolymers thereof and CPVC copolymers) is from about 30 percent to about 90 percent, desirably from about 50 percent to about 90 percent and preferably from about 70 percent to about 90 percent by weight.

The aromatic polycarbonates of the present invention generally have a low molecular weight, that is a weight average molecular weight of from about 10,000 to about 200,000 and preferably from about 10,000 to about 30,000. Aromatic polycarbonates include various homopolycarbonates, various copolycarbonates and/or mixtures of various homo- and copolycarbonates. The amount of such aromatic polycarbonates is from about 10 percent to about 80 percent by weight and preferably from about 10 percent to about 30 percent by weight based upon the total weight of the CPVC and polycarbonate polymers only.

The specific types of aromatic polycarbonates utilized generally are not critical to the present invention provided that they are utilized in an amount and have a molecular weight as set forth hereinabove. Accordingly, various conventional types of aromatic polycarbonates can be utilized as well as other polycarbonates known to the art and to the literature. As part of the literature, numerous polycarbonate patents exist and the specific types of aromatic polycarbonates set forth therein can be utilized. A specific example of suitable aromatic polycarbonates which can be utilized is set forth with particularity in U.S. Pat. No. 4,515,925 which is hereby fully incorporated by reference. Generally, such aromatic polycarbonates are made from diphenols corresponding to the formula

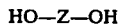

HO—Z—OH wherein Z represents a divalent mono- or polynuclear aromatic radical having from 6 to 30 carbon atoms, and is constructed such that each of the two OH groups is directly bound to a carbon atom of an aromatic system. Examples of other types of polycarbonates are set forth in U.S. Pat. Nos. 3,544,514; 4,005,037; 4,105,711; 4,239,861; and 4,513,119, all of which are hereby incorporated by reference with regard to the preparation of the various polycarbonates as well as the different types thereof. A description of still other suitable polycarbonates is set forth in the Kirk-Othmer Encyclopedia of Chemical Technology, third edition, Volume 18, pages 479–494, Wiley 1982, New York, which is hereby fully incorporated by reference with regard to all aspects thereof.

In polycarbonates, groups of dihydric and polyhydric phenols are linked through carbonate groups. Typically, polycarbonates are derived from bisphenol A and diphenyl carbonate through an ester exchange. Polycarbonates can also be made utilizing small amounts of other polyhydric phenols. The polycarbonates of the present invention are usually melt processable at temperatures of from about 260° C. to about 300° C. Such temperatures are generally too high for melt mixing or blending with CPVC resins since such high temperatures cause degradation of the CPVC, as previously discussed herein.

Aromatic polycarbonates are widely commercially available, with specific examples including General Electric Lexan polycarbonates, and desirably Lexan High Flow; Dow Chemical's Calibre polycarbonates, and preferably high melt flow polycarbonates thereof; and Mobay Chemical's Makrolon polycarbonate resins, and preferably Makrolon FCR series.

In accordance with the present invention, impact modifiers are utilized to produce a compatible blend of CPVC with a much higher melting thermoplastic such as polycarbonate. The melting point of the polycarbonate is an important consideration since mixing at a temperature high enough to melt the polycarbonate generally causes degradation of the CPVC and, alternatively, mixing at a temperature low enough to eliminate degradation of the CPVC generally prevents proper melting of the polycarbonate thereby resulting in a blend having poor physical properties, and in particular poor impact strength.

According to the concepts of the present invention, it has unexpectedly been found that the use of generally conventional impact modifiers results in compatible blends of CPVC and polycarbonate with the blends having improved high heat distortion temperatures, improved Izod notched impact strengths and improved processability.

The CPVC/polycarbonate thermoplastic blends of the present invention can be compatibilized with conventional core-shell impact modifiers which are well known to the art and to the literature. The various core-shell impact modifiers which can be utilized in the present invention are polymers with the core polymer desirably being crosslinked and the shell polymer desirably being grafted onto the core. A suitable class of core-shell impact modifiers are those containing a polyacrylate core and a poly (alkyl methacrylate) shell. The various polyacrylates are made from acrylate monomers containing from 1 to 12 carbon atoms in the ester portion thereof with specific examples including methyl acrylate, ethyl acrylate, propyl acrylate, pentyl acrylate, and the like, with butyl acrylate and 2-ethyl hexyl acrylate being preferred. The shell is a polymer made from esters of methacrylic acid wherein the ester portion has from about 1 to about 4 carbon atoms with 1 carbon atom, that is methyl methacrylate, being preferred.

Another class of core-shell impact modifiers are those wherein the core is a polymer made from conjugated dienes having from 4 to 8 carbon atoms such as butadiene, isoprene, hexadiene, and the like, with butadiene being preferred. The shell typically can be a copolymer made from alkyl methacrylates wherein the ester portion has from 1 to 8 carbon atoms with 1 or 2 carbon atoms being preferred, that is methyl methacrylate or ethyl methacrylate, with methyl methacrylate being preferred. The comonomer is typically a vinyl substituted aromatic having from 8 to 12 carbon atoms such as styrene, alpha methyl styrene, and the like, with styrene being preferred.

Still another class of core-shell impact modifiers are those wherein the core is a polymer made from various conjugated diene monomers having from 4 to 8 carbon atoms with butadiene being preferred and wherein the shell is a copolymer made from acrylonitrile monomers as well as various vinyl substituted aromatic monomers having from 8 to 12 carbon atoms such as styrene, alphamethyl styrene, and the like, with styrene being preferred.

Another class of core-shell impact modifiers are those wherein the core is an EPDM copolymer, that is a copolymer made from ethylene, propylene, and diene monomers. The amount of the diene monomers is generally quite small as up to about 15 parts by weight and desirably up to about 7 parts by weight per 100 parts by weight of total monomers. The diene monomer typically can have from 4 to 10 carbon atoms with specific examples including butadiene, pentadiene, hexadiene, norbornadiene, ethylidenenorbornene, dicyclopentadiene and the like, with ethylidenenorbornene (ENB) being preferred. The shell of this class of core-shell impact modifiers is generally a copolymer made from acrylonitrile and vinyl substituted aromatic monomers such as those set forth in the preceding paragraph with a copolymer of acrylonitrile-styrene being preferred.

Generally, the conjugated diene core impact modifiers are preferred. The core polymers of the various impact modifiers are desirably crosslinked as noted with suitable conventional crosslinking agents which are well-known to the art and to the literature, including polyethylenically unsaturated monomers such as polyacrylates and polymethacrylates, divinyl benzene, and monomers capable of ionic and coordinate cross-linking such as acid groups and organic and inorganic bases and other electron donating groups coordinating with suitable electorophilic agents. The polyethylenically unsaturated monomers include polyacrylic and polymethacrylic esters of polyols, such as 1,3-butylene diacrylate and dimethacrylate, trimethylol propane trimethacrylate and the like, di-and tri-vinyl benzene, vinyl acrylate and methacrylate, and other common cross-linking monomers. The various shell polymers are grafted onto the core by a free radical graft polymerization method generally utilizing a peroxide graft-linking agent, which method is well known to the art and to the literature.

Generally the amount of the impact modifier utilized is an effective amount to improve physical properties of the thermoplastic blend of CPVC and polycarbonate. Such effective amounts are generally from about 5 to about 30 parts by weight, desirably from about 7 to about 25 parts by weight, and preferably from about 10 to about 20 parts by weight per 100 parts by weight of the CPVC-polycarbonate blend polymers.

The impact modifier can be added directly to the CPVC and the polycarbonate and simultaneously mixed with both components at elevated temperatures. Suitable mixing devices include Banbury, a two roll mill, any type of extrusion mixing, and the like, with suitable temperatures generally being from about 210° C. to about 235° C. and desirably from about 215° C. to about 230° C. Another manner of mixing involves premixing one or more components such as the polycarbonate and impact modifier at elevated temperatures and subsequently blending the same with the CPVC. The preblend can generally be mixed in any conventional mixing apparatus such as a Banbury, a two-roll mill, any type of extruder, and the like, at temperatures as from about 220° C. to about 260° C., with from about 230° C. to about 250° C. being preferred. The subsequent mixing of the preblend with the CPVC can also be carried out in conventional mixing equipment as noted immediately hereinabove and at temperatures of generally from about 210° C. to about 235° C. and preferably from about 215° C. to about 230° C. As previously discussed, the impact modified CPVC-polycarbonate blends of the present invention have improved properties such as improved heat distortion temperatures, impact strength, and processability.

Conventional additives which are well known to the art and to the literature can be added to the CPVC/polycarbonate blends such as vinyl stabilizers, antioxidants, lubricants, heat stabilizers, and pigments such as titanium dioxide and carbon black.

It is important to note that the chlorinated polyvinyl chloride/polycarbonate blend of the present invention having improved heat distortion temperatures, impact strength, and processability, is obtained without the addition of ethylene-based functional polymers.

The ethylene-based functional polymer is generally a copolymer of ethylene and at least one other monomer containing functional groups thereon. Generally, the remaining comonomer can be a vinyl ester having a total of from 1 to about 10 carbon atoms with acetate being preferred. The amount of the vinyl ester component of the ethylene-based functional copolymer is from about 5 to about 50 percent by weight and desirably from about 10 to about 35 percent by weight. The ethylene-vinyl ester copolymers are often utilized as a blend with a small amount of another ethylene copolymer. The additional monomers of the second copolymer which contains functional groups are usually vinyl organic acids or organic anhydrides. For example, the additional comonomer can be acrylic acid, methacrylic acid, and various hydrocarbon derivatives thereof as well as maleic anhydride, or various derivatives thereof, wherein said acids and said anhydrides have a total of from 3 to 12 carbon atoms. Methacrylic acid is a preferred comonomer. The additional monomer of the second copolymer generally exists in a small amount as from about 1 percent to about 25 percent by weight based upon the total weight of the second or additional copolymer. When utilized, the amount of the second copolymer is generally small, as from about 0 or 1 percent to about 50 percent by weight and desirably from about 5 percent to about 40 percent by weight. Thus, the amount of the ethylene-vinyl ester copolymer exists in amount of from about 50 percent to about 100 percent by weight and preferably from about 60 percent to about 95 percent by weight. Other types of ethylene-based functional polymers or copolymers are set forth in U.S. Pat. No. 4,230,830, which is hereby fully incorporated by reference. U.S. Pat. No. 4,230,830 relates to a polymer blend consisting essentially of a. about from 80 to 99 percent by weight of a first olefinic polymer selected from (i) non-polar ethylene polymers and copolymers having a density of about from 0.930 to 0.965 g/cc and (ii) copolymers of ethylene having up to about 30 weight percent of at least one ethylenically unsaturated ester having from 4 to 12 carbon atoms; and b. about from 1 to 19 percent of a second olefinic polymer selected from the group consisting of (i) non polar ethylene polymers and copolymers having a density of about from 0.945 to 0.965 g/cc and (ii) terpolymers of ethylene, at least one a-olefin having from 3 to 6 carbon atoms, and at least one non-conjugated diene; the second olefinic polymer being thermally grafted with an unsaturated acid or anhydride to give a copolymer having about from 0.02 to 4.0 weight percent of grafted succinic groups, provided, however, that when the second olefinic polymer is (ii), then the first olefinic polymer is (ii).

Again, it should be understood that the chlorinated polyvinyl chloride/polycarbonate blend of the present invention having the above-discussed improved properties, is produced without and is completely free of any ethylene-based functional polymer.

The invention will be better understood by reference to the following examples and tables.

EXAMPLE 1

Various preblends of a polycarbonate, a CPVC, and methylmethacrylate-butadiene-styrene (NBS) impact modifier were blended together with one or more additives including Irganox 3125 (an antioxidant), a tin heat stabilizer, an oxidized polyethylene and paraffin wax. Each of the preblends A, B, and C shown in Table I were prepared by mixing the respective components of each preblend in a Banbury mixer at 220° to 240° C. for 1-3 minutes. Recipe B then was tested for physical properties which are listed in column 2 of Table I', which serves as a control to illustrate the properties of CPVC prior to blending with a polycarbonate. Recipes A and B were blended in a Banbury mixer at 220° to 230° C. for 1-3 minutes, then tested for physical properties which are listed in column 1 of Table I', which illustrates the physical properties obtained in the thermoplastic blend when the polycarbonate and MBS modifier were preblended and the CPVC and MBS modifier were preblended with the preblends subsequently being mixed together. Column 3 illustrates the physical properties of the thermoplastic blend when the polycarbonate, CPVC and MBS modifier, as well as any additives, were mixed in situ. As can be readily ascertained from the data, improved heat distortion temperatures and notched Izod impact strengths were obtained by blending CPVC with polycarbonate by using compatibilizing agent MBS, over the properties obtained by CPVC alone blended with MBS. It can further be seen that the physical properties obtained whether by preblending or mixing in situ were generally equivalent.

TABLE I

| Recipe | A | B | C |
|---|---|---|---|
| Makrolon 2405 (Polycarbonate) | 100 | | 30 |
| CPVC, 68% Cl₂ | | 100 | 70 |
| Kane Ace B-56 (M-B-S Modifier) | 15 | 15 | 15 |
| Irganox 3125 (Antioxidant) | .5 | | 0.15 |
| Dibutyl Tin Bis Isooctyl Thioglycolate | | 2.5 | 1.75 |
| Allied AC629A (Oxidized Polyethylene) | | 1.5 | 1.05 |
| Paraffin Wax, 165° F. M.P. | | 1.0 | 0.7 |

| | 1 | 2 | 3 |
|---|---|---|---|
| Recipe A | 30 | | |
| Recipe B | 70 | 100 | (Control) |

TABLE I-continued

| Recipe C | | | 100 (in situ mixed) |
|---|---|---|---|
| Tensile Strength, PSI | 6,910 | 6,780 | 6,890 |
| Tensile Modulus, PSI | 340,000 | 358,000 | 335,000 |
| Elongation, % | 20 | 20 | 17 |
| Izod ⅛" 23° C. Ft-Lbs/In | 7.07 | — | 6.53 |
| Izod ⅛" −20° C., Ft-Lbs/In | 4.27 | 2.26 | 3.46 |
| HDT ⅛" Unannealed, °C. | 93 | 88 | 91 |
| HDT ⅛" Annealed, °C. (3 hrs. @ 95° C.) | 102 | 102 | 105 |
| Melt Index, Grams/10 minutes (10,100 gms @ 215° C.) | 6.5 | 7.1 | 10.3 |
| Specific Gravity | 1.33 | 1.43 | 1.34 |
| Dynamic Thermal Stability Time, Minutes | 14.5 | 13.0 | 14.0 |
| Minimum Torque, Meter-Grams | 1800 | 1580 | 1500 |
| Maximum Stock Temp., °C. | 213 | 213 | 212 |
| Oxygen Index, % | 34.4 | — | — |
| UL 94, ⅛ inch | VO | — | — |

EXAMPLE 2

A recipe D preblend was made by mixing Makrolon 2405 polycarbonate with Kane Ace B-56 MBS impact modifier, together with Irganox 3125 antioxidant in a Banbury mixer at 230° to 250° C. for 1-3 minutes. Another preblend recipe E was made by mixing CPVC having a 68 percent chlorine content with the Kane Ace B-56 impact modifier and additives dibutyl tin bis-isooctyl thioglycolate, Allied AC-629A oxidized polyethylene and paraffin wax in a Banbury mixer at 215° to 225° C. for 1-3 minutes. Recipes D and E then were blended in various proportions in a Banbury mixer at 220 to 230° C. for 1-3 minutes as shown in Table II', columns 4, 5 and 6, and the physical properties thereof were measured. As can be seen from the results, improvements in notched Izod impact strength and heat distortion temperature were directly proportional to the amount of polycarbonate utilized in the recipe.

TABLE II

| Recipe D | |
|---|---|
| Makrolon 2405 (Polycarbonate) | 100 |
| Kane Ace B-56 (Manufactured by Kaneka) (Methyl Methacrylate-Butadiene-Styrene Modifier) | 15 |
| Irganox 3125 (Antioxidant) | .5 |
| Recipe E | |
| CPVC (68% Cl₂) | 100 |
| Dibutyl Tin Bis-Isooctyl Thioglycolate | 2.5 |
| Kane Ace B-56 | 15 |
| Allied AC-629A (Oxidized Polyethylene) | 1.5 |
| Paraffin Wax, 165° F. M.P. | 1 |

| | 4 | 5 | 6 |
|---|---|---|---|
| Recipe D | 20 | 40 | 75 |
| Recipe E | 80 | 60 | 25 |
| Izod ⅛ In, 23° C. Ft-Lbs/In | 6.2 | 7.1 | 8.0 |
| Izod ⅛ In, −20° C. Ft-Lbs/In | 1.55 | 4.53 | 6.41 |
| HDT unannealed, °C. | 88 | 94 | 107 |
| HDT annealed, °C. | 105 | 110 | 114 |
| Tensile Strength, PSI | 7000 | 7000 | 7000 |
| Elongation,% | 22 | 33 | 73 |
| Melt Index, Grams/10 Minutes (10,100 gms @ 215° C.) | 6.4 | 6.6 | 2.1 |
| Specific Gravity | 1.36 | 1.31 | 1.21 |
| Dynamic Thermal Stability | 29 | 21 | 19 |
| Min. Torque, Meter-Grams | 1650 | 1950 | 2450 |
| Max. Temp., °C. | 214 | 215 | 217 |

EXAMPLE 3

CPVC and polycarbonate were blended together with small amounts of additives including dibutyl tin bis-isooctyl thioglycolate, oxidized polyethylene, paraffin wax, and Irganox 1010 antioxidant, and either Kane Ace B-56 MBS modifier (Recipe F) or Paraloid KM-330 acrylic-type modifier (Recipe G) in a Banbury mixer at 220° to 230° C. for 1-3 minutes. The physical properties of the two recipes then were measured as set forth in Table III'. Although heat distortion temperatures for the two recipes were generally comparable, it can be seen that the MBS modifier is superior in producing a CPVC/polycarbonate blend having good impact resistance as compared to a blend utilizing the acrylic modifier. However, it should be noted that use of acrylic modifier may be indicated where increased weatherability in the thermoplastic blend is desired as a trade off to impact resistance.

TABLE III

| Recipe | F | G |
| --- | --- | --- |
| CPVC (68% Cl₂) | 80 | 80 |
| Dow Calibre PC 300 (Polycarbonate) | 20 | 20 |
| Kane Ace B-56 (M-B-S Modifier) | 15 | |
| Paraloid KM-330 (Acrylic Modifier) | | 20 |
| Dibutyl Tin Bis-Isooctyl Thioglycolate | 2 | 2 |
| Allied AC629A (Oxidized Polyethylene) | 1.2 | 1.2 |
| Paraffin Wax, 165° M.P. | 0.8 | 0.8 |
| Irganox 1010 (Antioxidant) | 0.1 | 0.1 |
| Tensile Strength, PSI | 7,000 | 6,700 |
| Elongation, % | 34 | 40 |
| Flexural Strength, PSI | 12,600 | 12,100 |
| Flexural Modulus, PSI | 366,000 | 341,000 |
| Izod ⅛", 23° C., Ft-Lbs/In | 6.66 | 2.63 |
| Izod ⅛", −20° C., Ft-Lbs/In | 1.04 | 0.37 |
| HDT ⅛" Unannealed, °C. | 88 | 89 |
| HDT ⅛" Annealed, °C. (3 hrs. @ 95° C.) | 106 | 105 |
| Melt Index, Grams/10 Minutes (10,100 gms @ 215° C.) | 15.1 | 16.2 |
| Specific Gravity | 1.37 | 1.37 |
| Dynamic Thermal Stability Time, Minutes | 17 | 24 |
| Minimum Torque, Meter-Grams | 1,230 | 1,350 |
| Maximum Temperature, °C. | 213 | 213 |

EXAMPLE 4

Polycarbonate recipes H and I each were made by mixing Makrolon 2405 polycarbonate (Recipe H) or Calibre PC₃₀₀ polycarbonate (Recipe I) with Paraloid KM 330 (acrylic modifier) and additives Irganox 1010 antioxidant and Ultranox 626 antioxidant in a Banbury mixer at 230° to 250° C. for 1-3 minutes. Polycarbonate recipe 1 was made by mixing the Makrolon 2405 polycarbonate with Royaltuf 372 EPDM-SAN impact modifier together with Irganox 1010 and Ultranox 626 antioxidants in a Banbury mixer at 230° to 250° C. for 1-3 minutes. CPVC recipes K and L were made by mixing the CPVC with either Paraloid KM 330 or Royaltuf 372 impact modifiers, respectively, together with various additives including titanium dioxide, a tin heat stabilizer, and lubricants, in a Banbury mixer at 215° to 225° C. for 1-3 minutes. Various combinations of the polycarbonate and CPVC recipes then were blended in a Banbury mixer at 220° to 230° C. for 1-3 minutes and the physical properties thereof measured in columns 7, 8 and 9 of Table IV'. The results show that the type of polycarbonate used in the thermoplastic blend has a negligible effect on desired physical properties, especially Izod notched impact strength and heat distortion temperature.

TABLE IV

| Recipe | H | I | J | K | L |
| --- | --- | --- | --- | --- | --- |
| Makrolon 2405 (Polycarbonate) | 100 | | 100 | | |
| Calibre PC 300 (Polycarbonate) | | 100 | | | |
| Paraloid KM 330 (Acrylic Modifier) | 15 | 15 | | | |
| Royaltuf 372 (EPDM-SAN) | | | 15 | | |
| Irganox 1010 (Antioxidant) | 0.25 | 0.25 | 0.25 | | |
| Ultranox 626 (Antioxidant) | 0.1 | 0.1 | 0.1 | | |
| CPVC 68% Cl₂ | | | | 100 | 100 |
| Dibutyl Tin Bis Isooctyl Thioglycolate | | | | 2.5 | 2.5 |
| Paraloid KM-330 (Acrylic Modifier) | | | | 15 | |
| Royaltuf 372 (EPDM-SAN) | | | | | 15 |
| Allied AC629A (Oxidized Polyethylene) | | | | 1.5 | 1.5 |
| Paraffin Wax, 165° F. M.P. | | | | 1.0 | 1.0 |
| Microthene FN570 (Polyethylene) | | | | 1.0 | 1.0 |
| Titanium Dioxide | | | | 6.5 | 6.5 |

| Recipe | 7 | 8 | 9 |
| --- | --- | --- | --- |
| H | 20 | | |
| I | | 20 | |
| J | | | 20 |
| K | 80 | 80 | |
| L | | | 80 |
| Tensile Strength, PSI | 6832 | 6533 | 7848 |
| Tensile Modulus, PSI | 337,800 | 351,200 | 391,500 |
| Elongation, % | 22.3 | 19.0 | 21.7 |
| Flex Strength, PSI | 12,920 | 12,950 | 14,380 |
| Flex Modulus, PSI | 363,400 | 366,900 | 397,700 |
| Izod ⅛" 23° C., Ft-Lbs/In | 2.63 | 257 | 2.43 |
| Izod ⅛" 20° C., Ft-Lbs/In | 1.10 | 1.28 | 0.81 |
| HDT ⅛" unannealed, °C. | 90 | 89 | 87 |
| HDT ⅛" annealed 3 hrs. @ 95° C., °C. | 107 | 107 | 107 |
| Melt Index (10,100 grms, @ 215° C.) Grams/10 Minutes | 15.4 | 17.6 | 13.6 |
| Specific gravity | 1.42 | 1.42 | 1.40 |
| Rockwell'R | 113 | 112 | 115 |
| Dynamic Thermal Stability Time, Minutes | 16 | 11.5 | 18 |
| Min. Torque, Meter-Grams | 1120 | 1060 | 1150 |
| Maximum Temperature, °C. | 212 | 212 | 213 |

While in accordance with the Patent Statutes, the best mode and preferred embodiment has been set forth, the scope of the invention is not limited thereto, but rather by the scope of the attached claims.

What is claimed is:

1. A thermoplastic polymer blend composition, comprising:
   a blend of from about 30 percent to about 90 percent by weight of a chlorinated polyvinyl chloride containing from 63 to about 70 percent by weight of chlorine therein, and optionally containing up to about 30 percent by weight of a chlorinated polyvinyl chloride copolymer based on the weight of the chlorinated polyvinyl chloride, and further optionally containing up to about 25 percent by weight of a polyvinyl chloride homopolymer and/or a polyvinyl chloride copolymer based on the weight of the chlorinated polyvinyl chloride, wherein said chlorinated polyvinyl chloride contains up to about 35 percent by weight of said optional CPVC copolymers, PVC homopolymer, and/or PVC copolymers based on the weight of the chlorinated polyvinyl chloride;

from about 10 percent to about 70 percent by weight of an aromatic polycarbonate; and from 5 parts to about 30 parts by weight per 100 parts by weight to of said chlorinated polyvinyl chloride and polycarbonate of a core-shell impact modified polymer so that the polymer blend has improved heat distortion temperature, and wherein said blend is free of ethylene polymers or ethylene based copolymers grafted with 0.02 to 4.0 weight percent succinc groups, wherein said blend is free of ethylene-vinyl ester copolymers, wherein said blend is free from ethylene polymers or copolymers having a density from 0.930 to 0.965 g/cc, wherein said blend is free of ethylene-vinyl organic acid copolymers, wherein said blend is free of ethylene-organic anhydride copolymers, and wherein said impact modifier polymer is a core-shell polymer having a crosslinked core polymer, and a shell polymer grafted onto said core polymer; wherein said core polymer is a polyacrylate having 1 to 12 carbon atoms in the ester portion thereof; and wherein said shell polymer is a poly(alkyl methacrylate) having 1 to 4 carbon atoms in the ester portion thereof.

2. A thermoplastic polymer blend composition, comprising:

a blend of from about 30 percent to about 90 percent by weight of a chlorinated polyvinyl chloride containing from 63 to about 70 percent by weight of chlorine therein, and optionally containing up to about 30 percent by weight of a chlorinated polyvinyl chloride copolymer based on the weight of the chlorinated polyvinyl chloride, and further optionally containing up to about 25 percent by weight of a polyvinyl chloride homopolymer and/or a polyvinyl chloride copolymer based on the weight of the chlorinated polyvinyl chloride, wherein said chlorinated polyvinyl chloride contains up to about 35 percent by weight of said optional CPVC copolymers, PVC homopolymer, and/or PVC copolymers based on the weight of the chlorinated polyvinyl chloride;

from about 10 percent to about 70 percent by weight of an aromatic polycarbonate; and from 5 parts to about 30 parts by weight per 100 parts by weight to of said chlorinated polyvinyl chloride and polycarbonate of a core-shell impact modified polymer so that the polymer blend has improved heat distortion temperature, and wherein said blend is free of ethylene polymers or ethylene based copolymers grafted with 0.02 to 4.0 weight percent succinc groups, wherein said blend is free of ethylene-vinyl ester copolymers, wherein said blend is free from ethylene polymers or copolymers having a density from 0.930 to 0.965 g/cc, wherein said blend is free of ethylene-vinyl organic acid copolymers, wherein said blend is free of ethylene-organic anhydride copolymers, and wherein the impact modifier polymer is a core-shell polymer having a crosslinked core polymer, and a shell polymer grafted onto said core polymer; wherein said core polymer is butyl acrylate or 2-ethyl hexyl acrylate, and said shell polymer is methyl methacrylate.

3. A thermoplastic polymer blend composition, comprising:

a blend of from about 30 percent to about 90 percent by weight of a chlorinated polyvinyl chloride containing from 63 to about 70 percent by weight of chlorine therein, and optionally containing up to about 30 percent by weight of a chlorinated polyvinyl chloride copolymer based on the weight of the chlorinated polyvinyl chloride, and further optionally containing up to about 25 percent by weight of a polyvinyl chloride homopolymer and/or a polyvinyl chloride copolymer based on the weight of the chlorinated polyvinyl chloride, wherein said chlorinated polyvinyl chloride contains up to about 35 percent by weight of said optional CPVC copolymers, PVC homopolymer, and/or PVC copolymers based on the weight of the chlorinated polyvinyl chloride;

from about 10 percent to about 70 percent by weight of an aromatic polycarbonate; and from 5 parts to about 30 parts by weight per 100 parts by weight to of said chlorinated polyvinyl chloride and polycarbonate of a core-shell impact modified polymer so that the polymer blend has improved heat distortion temperature, and wherein said blend is free of ethylene polymers or ethylene based copolymers grafted with 0.02 to 4.0 weight percent succinc groups, wherein said blend is free of ethylene-vinyl ester copolymers, wherein said blend is free from ethylene polymers or copolymers having a density from 0.930 to 0.965 g/cc, wherein said blend is free of ethylene-vinyl organic acid copolymers, wherein said blend is free of ethylene-organic anhydride copolymers, and wherein the impact modifier polymer is a core-shell polymer having a crosslinked core polymer, and a shell polymer grafted onto said core polymer; wherein said core polymer is conjugated diene having 4 to 8 carbon atoms; and wherein said shell polymer is a copolymer of acrylonitrile monomers and vinyl substituted aromatic comonomers having 8 to 12 carbon atoms.

4. The thermoplastic polymer blend of claim 3, wherein the impact modifier polymer wherein said core polymer is butadiene, and said shell polymer is an acrylonitrile-stryene copolymer.

5. A thermoplastic polymer blend composition, comprising:

a blend of from about 30 percent to about 90 percent by weight of a chlorinated polyvinyl chloride containing from 63 to about 70 percent by weight of chlorine therein, and optionally containing up to about 30 percent by weight of a chlorinated polyvinyl chloride copolymer based on the weight of the chlorinated polyvinyl chloride, and further optionally containing up to about 25 percent by weight of a polyvinyl chloride homopolymer and/or a polyvinyl chloride copolymer based on the weight of the chlorinated polyvinyl chloride, wherein said chlorinated polyvinyl chloride contains up to about 35 percent by weight of said optional CPVC copolymers, PVC homopolymer and/or PVC copolymers based on the weight of the chlorinated polyvinyl chloride;

from about 10 percent to about 70 percent by weight of an aromatic polycarbonate; and from 5 parts to about 30 parts by weight per 100 parts by weight to of said chlorinated polyvinyl chloride and polycarbonate of a core-shell impact modified polymer so that the polymer blend has improved heat distortion temperature, and wherein said blend is free of ethylene polymers or ethylene based copolymers grafted with 0.02 to 4.0 weight percent succinc groups, wherein said blend is free of ethylene-vinyl ester copolymers, wherein said blend is free from ethylene polymers or copolymers having a density from 0.930 to 0.965 g/cc, wherein said blend is free of ethylene-vinyl organic acid copolymers, wherein said blend is free of ethylene-organic anhydride copolymers, and wherein the impact modifier polymer is a core-shell polymer having a crosslinked core polymer, and a shell polymer grafted onto said core polymer; wherein said core polymer is an EPDM copolymer having a diene monomer containing 4 to 10 carbon atoms and further having a diene monomer content of up to about 15 parts by weight based on the total weight of the ethylene, propylene, and diene monomers contained in the EPDM copolymer; and wherein said shell polymer is a copolymer of acrylonitrile monomers and vinyl substituted aromatic comonomers having 8 to 12 carbon atoms.

6. A thermoplastic polymer blend of claim 5: wherein said core polymer is an EPDM copolymer having a diene monomer containing 4 to 10 carbon atoms and further having a diene monomer content of up to about 7 parts by weight based on the total weight of ethylene, propylene and diene monomers contained in the EPDM copolymer; and wherein said shell polymer is an acrylontrile-styrene copolymer.

7. The thermoplastic polymer blend of claim 1, wherein from about 7 to about 25 parts by weight of said impact modifier are utilized based on 100 parts by weight of the blend of chlorinated polyvinyl chloride and polycarbonate.

8. The thermoplastic polymer blend of claim 2, wherein from about 7 to about 25 parts by weight of said impact modifier are utilized based on 100 parts by weight of the blend of chlorinated polyvinyl chloride and polycarbonate.

9. The thermoplastic polymer blend of claim 3, wherein from about 7 to about 25 parts by weight of said impact modifier are utilized based on 100 parts by weight of blend of chlorinated polyvinyl chloride and polycarbonate.

10. The thermoplastic polymer blend of claim 5, wherein from about 7 to about 25 parts by weight of said impact modifier are utilized based on 100 parts by weight of blend of chlorinated polyvinyl chloride and polycarbonate.

11. The thermoplastic polymer blend of claim 4, wherein from about 7 to about 25 parts by weight of said impact modifier are utilized based on 100 parts by weight of the blend of chlorinated polyvinyl chloride and polycarbonate.

12. The thermoplastic polymer blend of claim 1, wherein from about 10 to about 20 parts by weight of said impact modifier are utilized based on 100 parts by weight of the blend of chlorinated polyvinyl chloride and polycarbonate.

13. The thermoplastic polymer blend of claim 2, wherein from about 10 to about 20 parts by weight of said impact modifier are utilized based on 100 parts by weight of the blend of chlorinated polyvinyl chloride and polycarbonate.

14. The thermoplastic polymer blend of claim 3 or claim 5 wherein from about 10 to about 20 parts by weight of said impact modifier are utilized based on 100 parts by weight of the blend of chlorinated polyvinyl chloride and polycarbonate.

15. The thermoplastic polymer blend of claim 4, wherein from about 10 to about 20 parts by weight of said impact modifier are utilized based on 100 parts by weight of the blend of chlorinated polyvinyl chloride and polycarbonate.

16. The thermoplastic polymer blend of claim 6, wherein from about 10 to about 20 parts by weight of said impact modifier are utilized based on 100 parts by weight of the blend of chlorinated polyvinyl chloride and polycarbonate.

17. The thermoplastic polymer blend of claim 1, wherein said blend comprises from about 50 percent to about 90 percent by weight of said chlorinated polyvinyl chloride; wherein said polymer blend optionally contains up to about 20 percent by weight of said chlorinated polyvinyl chloride copolymer based on the weight of the chlorinated polyvinyl chloride; wherein said polymer blend optionally contains up to about 10 percent by weight of said polyvinyl chloride homopolymer and/or said polyvinyl chloride copolymer based on the weight of the chlorinated polyvinyl chloride; wherein said polyvinyl chloride copolymer contains vinyl chloride monomers and vinyl type comonomers; and wherein said vinyl type comonomers comprise up to about 30 percent by weight of the polyvinyl chloride copolymer based on the wight of the polyvinyl chloride copolymer; and wherein said vinyl type comonomers are selected from the group consisting of esters of acrylic acid wherein the ester portion has 1 to 12 carbon atoms, vinyl acetate, esters of methacrylic acid wherein the ester portion has 1 to 12 carbon atoms, styrene, styrene derivatives having 8 to 15 carbon atoms, diolefins having 4 to 8 carbon atoms, halogenated diolefins, and monoolefins having 2 to 10 carbon atoms.

18. The thermoplastic polymer blend of claims 2 or 14, wherein said blend comprises from about 50 percent to about 90 percent by weight of said chlorinated polyvinyl chloride; wherein said polymer blend optionally contains up to about 20 percent by weight of said chlorinated polyvinyl chloride copolymer based on the weight of the chlorinated polyvinyl chloride; wherein said polymer blend optionally contains up to about 10 percent by weight of said polyvinyl chloride homopolymer and/or said polyvinyl chloride copolymer based on the weight of the chlorinated polyvinyl chloride; wherein said polyvinyl chloride copolymer contains vinyl chloride monomers and vinyl type comonomers; and wherein said vinyl type comonomers comprise up to about 30 percent by weight of the polyvinyl chloride copolymer based on the weight of the polyvinyl chloride copolymer; and wherein said vinyl type comonomers are selected from the group consisting of esters of acrylic acid wherein the ester portion has 1 to 12 carbon atoms, vinyl acetate, esters of methacrylic acid wherein the ester portion has 1 to 10 carbon atoms, styrene, styrene derivatives having 8 to 15 carbon atoms, diolefins having 4 to 8 carbon atoms, halogenated diolefins, and monoolefins having 2 to 19 carbon atoms.

19. The thermoplastic polymer blend of claim 15, wherein said blend comprises from about 50 percent to about 90 percent by weight of said chlorinated polyvinyl chloride; wherein said polymer blend optionally contains up to about 20 percent by weight of said chlorinated polyvinyl chloride copolymer based on the weight of the chlorinated polyvinyl chloride; wherein said polymer blend optionally contains up to about 10 percent by weight of said polyvinyl chloride homopolymer and/or said polyvinyl chloride copolymer based on the weight of the chlorinated polyvinyl chloride; wherein said polyvinyl chloride copolymer contains vinyl chloride monomers and vinyl type comonomers; and wherein said vinyl type comonomers comprise up to about 30 percent by weight of the polyvinyl chloride copolymer based on the weight of the polyvinyl chloride copolymer; and wherein said vinyl type comonomers are selected from the group consisting of esters of acrylic acid wherein the ester portion has 1 to 12 carbon atoms, vinyl acetate, esters of methacrylic acid wherein the ester portion has 1 to 12 carbon atoms, styrene, styrene derivatives having 8 to 15 carbon atoms, diolefins having 4 to 8 carbon atoms, halogenated diolefins, and monoolefins having 2 to 10 carbon atoms.

20. The thermoplastic polymer blend of claim 1; wherein said blend comprises from about 70 percent to about 90 percent by weight of the chlorinated polyvinyl chloride containing from 63 percent to about 70 percent by weight of chlorine therein; wherein said polymer blend optionally contains up to about 20 percent by weight of said chlorinated polyvinyl chloride copolymer based on the weight of the chlorinated polyvinyl chloride; wherein said polymer blend further optionally contains up to about 10 percent by weight of said polyvinyl chloride homopolymer and/or said polyvinyl chloride copolymer based on the weight of the chlorinated polyvinyl chloride; wherein said polyvinyl chloride copolymer contains vinyl chloride monomers and vinyl type comonomers; wherein said polyvinyl chloride copolymer contains up to about 20 percent by weight of said vinyl-type comonomer based on the weight of the polyvinyl chloride copolymer; and wherein said vinyl type comonomers are selected from the group consisting of esters of acrylic acid wherein the ester portion has 1 to 12 carbon atoms, esters of methacrylic acid wherein the ester portion has 1 to 12 carbon atoms, styrene, styrene derivatives having 8 to 15 carbon atoms, diolefins having 4 to 8 carbon atoms, and isobutylene.

21. The thermoplastic polymer blend of claim 2, or 14, wherein said blend comprises from about 70 percent to about 90 percent by weight of the chlorinated polyvinyl chloride containing from 63 percent to about 70 percent by weight of chlorine therein; wherein said polymer blend optionally contains up to about 20 percent by weight of said chlorinated polyvinyl chloride copolymer based on the weight of the chlorinated polyvinyl chloride; wherein said polymer blend further optionally contains up to about 10 percent by weight of said polyvinyl chloride homopolymer and/or said polyvinyl chloride copolymer based on the weight of the chlorinated polyvinyl chloride; wherein said polyvinyl chloride copolymer contains vinyl chloride monomers and vinyl type comonomers; wherein said polyvinyl chloride copolymer contains up to about 20 percent by weight of said vinyl-type comonomer based on the weight of the polyvinyl chloride copolymer; and wherein said vinyl type comonomers are selected from the group consisting of esters of acrylic acid wherein the ester portion has 1 to 12 carbon atoms, esters of methacrylic acid wherein the ester portion has 1 to 12 carbon atoms, styrene, styrene derivatives having 8 to 15 carbon atoms, diolefins having 4 to 8 carbon atoms, and isobutylene.

22. The thermoplastic polymer blend of claim 15; wherein said blend comprises from about 70 percent to about 90 percent by weight of the chlorinated polyvinyl chloride containing from 63 percent to about 70 percent by weight of chlorine therein; wherein said polymer blend optionally contains up to about 20 percent by weight of said chlorinated polyvinyl chloride copolymer based on the weight of the chlorinated polyvinyl chloride; wherein said polymer blend further optionally contains up to about 10 percent by weight of said polyvinyl chloride homopolymer and/or said polyvinyl chloride copolymer based on the weight of the chlorinated polyvinyl chloride; wherein said polyvinyl chloride copolymer contains vinyl chloride monomers and vinyl type comonomers; wherein said polyvinyl chloride copolymer contains up to about 20 percent by weight of said vinyl-type comonomer based on the weight of the polyvinyl chloride copolymer; and wherein said vinyl type comonomers are selected from the group consisting of esters of acrylic acid wherein the ester portion has 1 to 12 carbon atoms, esters of methacrylic acid wherein the ester portion has 1 to 12 carbon atoms, styrene, styrene derivatives having 8 to 15 carbon atoms, diolefins having 4 to 8 carbon atoms, and isobutylene.

23. The thermoplastic polymer blend of claim 1, wherein said polycarbonate comprises from about 10 percent to about 30 percent by weight of the blend of chlorinated polyvinyl chloride and polycarbonate; and wherein said polycarbonate has a molecular weight of from about 10,000 to about 200,000.

24. The thermoplastic polymer blend of claim 21, wherein said polycarbonate comprises from about 10 percent to about 30 percent by weight of the blend of chlorinated polyvinyl chloride and polycarbonate; and wherein said polycarbonate has a molecular weight of from about 10,000 to about 200,000.

25. The thermoplastic polymer blend of claim 22, wherein said polycarbonate comprises from about 10 percent to about 30 percent by weight of the blend of chlorinated polyvinyl chloride and polycarbonate; and wherein said polycarbonate has a molecular weight of from about 10,000 to about 200,000.

26. The thermoplastic polymer blend of claim 1, wherein said polycarbonate comprises from about 10 percent to about 30 percent by weight of the blend of chlorinated polyvinyl chloride and polycarbonate; and wherein said polycarbonate has a molecular weight of from about 10,000 to about 30,000.

27. The thermoplastic polymer blend of claim 21, wherein said polycarbonate comprises from about 10 percent to about 30 percent by weight of the blend of chlorinated polyvinyl chloride and polycarbonate; and wherein said polycarbonate has a molecular weight of from about 10,000 to about 30,000.

28. The thermoplastic polymer blend of claim 22, wherein said polycarbonate comprises from about 10 percent to about 30 percent by weight of the blend of chlorinated polyvinyl chloride and polycarbonate; and wherein said polycarbonate has a molecular weight of from about 10,000 to about 30,000.

* * * * *

UNITED STATES PATENT AND TRADEMARK OFFICE
CERTIFICATE OF CORRECTION

PATENT NO. : 5,268,424  
DATED : December 7, 1993  
INVENTOR(S) : Dennis L. Lawson Page 1 of 2

It is certified that error appears in the above-indentified patent and that said Letters Patent is hereby corrected as shown below:

In column 15, claim 2, line 33, before the phrase "63 to about 70", insert the word --about--.

In column 15, claim 2, line 50, after the phrase "by weight", delete the word "to".

In column 15, claim 2, line 51, delete "modified" and substitute --modifier-- therefore.

In column 15, claim 2, line 56, delete "succinc" and substitute --succinic-- therefore.

In column 16, claim 3, line 5, after the phrase "63", insert --percent--.

In column 16, claim 3, line 22, after the phrase "by weight", delete "to".

Column 16, claim 3, line 23, delete "modified" and substitute --modifier-- therefore.

In column 16, claim 5, line 51, insert "percent" after "63".

In column 16, claim 5, line 68, delete "to" after the phrase "by weight".

In column 17, claim 5, line 1, delete "modified" and substitute "modifier".

In column 17, claim 6, line 32, delete "acrylontrile" and substitute therefore --acrylonitrile--.

UNITED STATES PATENT AND TRADEMARK OFFICE
CERTIFICATE OF CORRECTION

PATENT NO. : 5,268,424

DATED : December 7, 1993

INVENTOR(S) : Dennis L. Lawson

It is certified that error appears in the above-indentified patent and that said Letters Patent is hereby corrected as shown below:

Column 16, claim 3, line 28, delete "succinc" and substitute therefore --succinic--.

Column 17, claim 5, line 6, delete "succinc" and substitute --succinic--.

Column 18, claim 17, line 31, delete "wight" and substitute therefore --weight--.

Signed and Sealed this

Fifth Day of July, 1994

BRUCE LEHMAN

Attest:

*Attesting Officer*     *Commissioner of Patents and Trademarks*